United States Patent [19]
Ohta

[11] Patent Number: 5,357,602
[45] Date of Patent: Oct. 18, 1994

[54] APPARATUS FOR TRANSFORMING A TWO-LEVEL IMAGE INTO CONTOUR VECTORS BY DECOMPOSING COMPOSITE FIGURES INTO "UNITARY" (OPEN) AND CLOSED-LOOP FIGURES, ESPECIALLY SUITABLE FOR MINIMIZING MEMORY USE WHILE MAINTAINING SYSTEM PROCESSING SPEED

[75] Inventor: Junichi Ohta, Yokohama, Japan

[73] Assignee: Ricoh Company, Ltd., Tokyo, Japan

[21] Appl. No.: 76,925

[22] Filed: Jun. 16, 1993

Related U.S. Application Data

[63] Continuation of Ser. No. 501,736, Mar. 30, 1990, abandoned.

[30] Foreign Application Priority Data

Apr. 3, 1989 [JP]  Japan ................................. 1-84399

[51] Int. Cl.⁵ .............................................. G06F 15/62
[52] U.S. Cl. ................................... 395/142; 395/133; 395/143
[58] Field of Search ................. 395/133, 139, 141–143, 395/150, 151

[56] References Cited

U.S. PATENT DOCUMENTS

| | | | |
|---|---|---|---|
| 4,368,462 | 1/1983 | Crawley | 340/723 |
| 4,561,061 | 12/1985 | Sakamoto et al. | 364/550 |
| 4,833,627 | 5/1989 | Leszczynski | 395/145 |

*Primary Examiner*—Heather R. Herndon
*Assistant Examiner*—Almis Jankus
*Attorney, Agent, or Firm*—Mason, Fenwick & Lawrence

[57]  ABSTRACT

An apparatus for transforming a line image, in the form of a two-level digital image, into contour vectors, and forming a center line for the image. First, the contour (or contours) of the image are traced and corrected, after which the center line of the image is determined based on the contour vectors that define opposite sides of the line image. In the contour correction process, composite line images having both "unitary" (open) figures such as in FIG. 7A, and closed-loop figures (such as in FIG. 7B) are decomposed into separably distinguishable unitary figures and closed-loop figures. This decomposition facilitates determination of the center line of the contour vectors, while reducing memory usage and not compromising processing speed as compared with known systems.

5 Claims, 14 Drawing Sheets

APPARATUS FOR TRANSFORMING A TWO-LEVEL IMAGE INTO CONTOUR VECTORS BY DECOMPOSING COMPOSITE FIGURES INTO "UNITARY" (OPEN) AND CLOSED-LOOP FIGURES, ESPECIALLY SUITABLE FOR MINIMIZING MEMORY USE WHILE MAINTAINING SYSTEM PROCESSING SPEED

This application is a continuation of U.S. patent application Ser. No. 07/501,736, filed Mar. 30, 1990 now abandoned.

BACKGROUND OF THE INVENTION

The present invention relates to a method of transforming into vectors a map, diagram or similar graphic line image which is implemented as a two-level digital image.

The recognition of various kinds of drawings such as a machine drawing and a logic circuit diagram has been extensively studied as means for automatically inputting graphic data to a CAD/CAM system and is now in a practical stage for some subjects to be dealt with. One of the fundamental techniques enabling the recognition of this kind of graphic image is the transformation of a raster image into vectors, i.e., approximating a linear portion of an input image by a vector that extends through the center thereof. This technique plays the most important role in the recognition of a drawing because it not only implements the analysis of an input image but also allows the resultant graphic data to be compressed or otherwise processed.

Methods heretofore proposed for generating vector data from a two-level image read by a digital scanner may generally be classified into two types, i.e., a method of the type using raster operations and a method of the type determining a center line out of a contour line. Typical of the raster operation type method is a skeltonizing procedure. The skeltonizing procedure is such that an input image having a line width of three dots is sequentially reduced, one dot at a time, until the line width decreases to one dot, and the so skeltonized image is approximated by vectors. On the other hand, the center line type procedure is such that, assuming that an input image also has a line width of three dots, a contour line of one dot is traced in one direction and approximated by straight lines to produce contour vectors, and then vector pairs each defining opposite sides of the resultant line figure are detected to determine their center lines. For details of the center line type procedure, a reference may be made to a paper entitled "Figure Processing Using Multi-Dimension Data Structure— Transformation of Figure into Vectors", The Institute of Electronics and Communication Engineers of Japan, Collected Papers, Vol. J68D, No. 4, Apr. 1985. The method disclosed in this paper promotes rapid and flexible processing despited the use of software and produces information associated with the line width and the intersection of lines during the course of processing. Also, the proposed method enhances rapid extraction of vector pairs by supervising contour vectors on a multi-dimension data structure basis.

A problem with the skeltonizing scheme, however, is that it needs substantial processing time although it preserves the connections of the original figure. Another problem is that rapid processing is not achievable without resorting to special-purpose hardware which would limit the flexibility of processing and add to cost. Further, skeltonization needs a memory having a large capacity and is apt to entail various kinds of noise. While the center line scheme is free from such problems, it has a drawback that vectors are segmented in those portions of an image where lines intersect each other.

SUMMARY OF THE INVENTION

It is therefore an object of the present invention to provide a method capable of transforming a line image into vectors at high speed with a minimum of memory capacity.

It is another object of the present invention to provide a method of transforming a line image into vectors while preventing vectors from being segmented at portions of the image where lines intersect each other.

It is another object of the present invention to provide a generally improved method of transforming a line image into vectors.

In accordance with the present invention, in a method of transforming a line image in the form of a two-level digital image into vectors by tracing a contour of the image and then determining a center line of contour vectors defining opposite sides of the image, a loop configuration of the contour vectors is decomposed and corrected into a simple configuration made up of a unitary figure and a closed-loop figure, and then center lines of the contour vectors are determined.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to prior art approaches for transforming a line image into vectors, shown in FIGS. 1A to 1C and 2A to 2C.

Figure 1A:
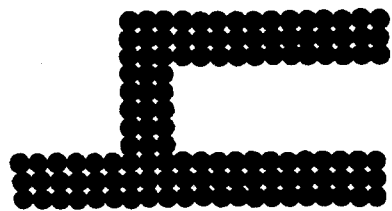
FIGS. 1A to 1C demonstrate a prior art skeltonization type vector data generating procedure.
Figure 1B:
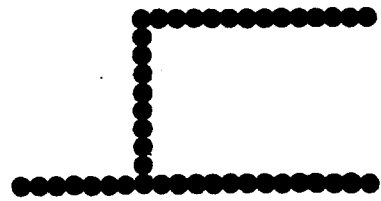
Figure 1C:
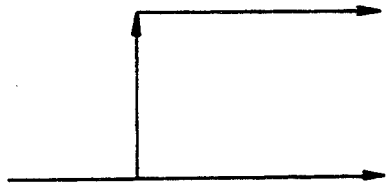

FIGS. 1A and 1b demonstrate a prior art approach which relies on skeltonization. As shown, an input image shown in FIG. 1A is sequentially thinned, one dot at a time, in the widthwise direction until the line width decreases to one dot, as shown in FIG. 1b. The so skeltonized image is approximated by vectors, as indicated in FIG. 1C. A problem with this scheme is that it is not feasible for high-speed processing and needs a memory having a large capacity.

Figure 2A:
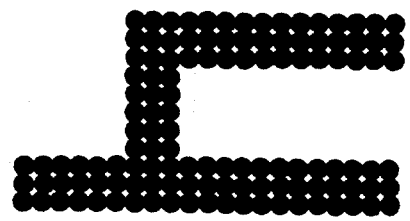
FIGS. 2A to 2C demonstrate a prior art center line type vector data generating procedure.
Figure 2B:
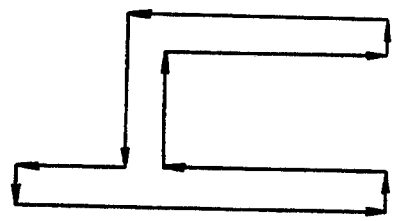
Figure 2C:
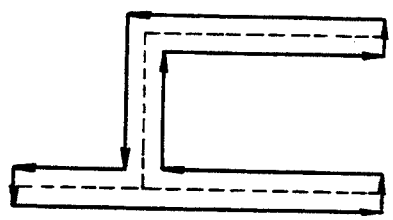

Another prior art approach using center lines is shown in FIGS. 2A to 2C. An input image shown in FIG. 2A has its contour lines traced, as shown in FIG. 2B. The contour lines are directly approximated by straight lines to generate contour vectors. Then, each pair of contour vectors defining opposite sides of the line image are found to determine the center line of the input image, as depicted in FIG. 2C. Such an approach is disadvantageous in that in a composite image, which will be described, the vectors are segmented at the points where lines intersect each other.

A preferred embodiment of the present invention which is free from the above-discussed problems will be described in detail with reference to the accompanying drawings.

A system for practicing the illustrative embodiment is implemented by a digital scanner and a host computer, although not shown in the drawings. While the digital scanner reads an image, the host computer processes two-level image data from the digital scanner to thereby produce vector data.

Figure 3:
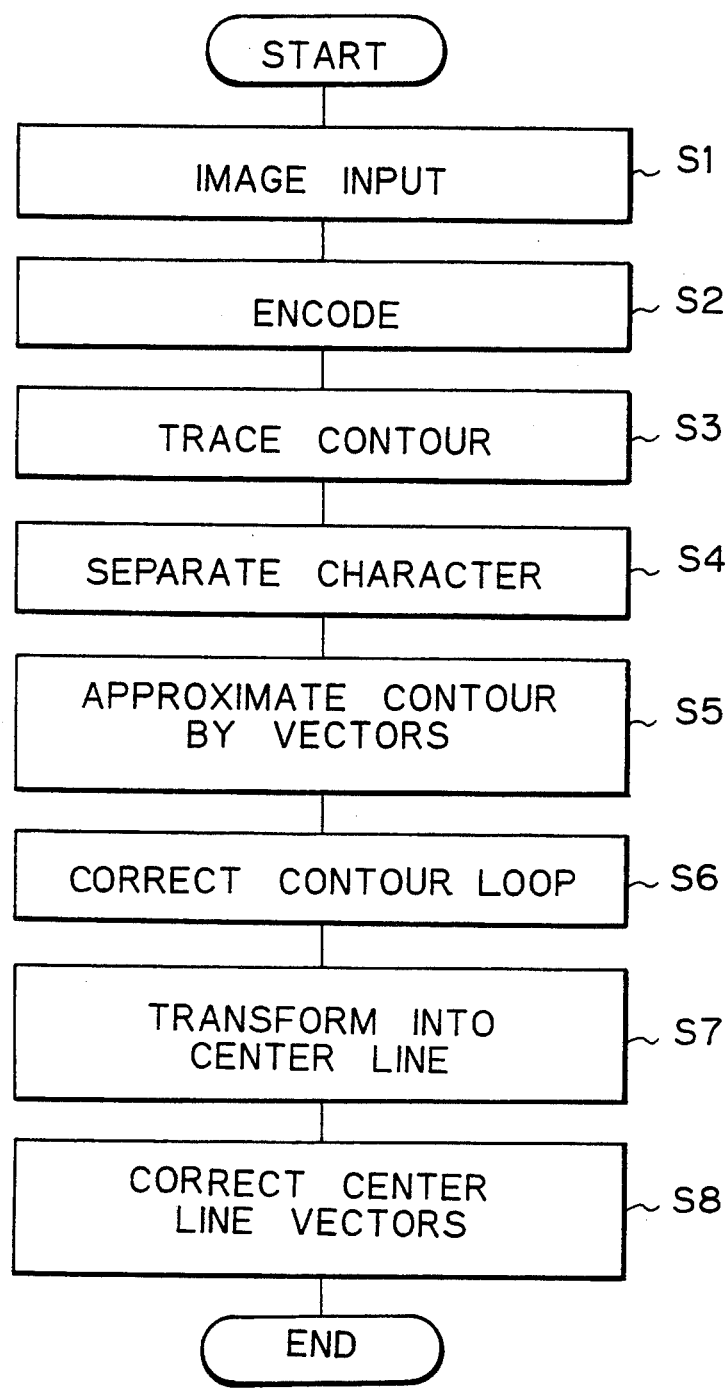
FIG. 3 is a flowchart outlining a method of transforming a line image into vectors embodying the present invention.

Referring to FIG. 3, processing to be executed by this embodiment is outlined. The processing begins with a step S1 for inputting an image read by the scanner. The read image is encoded into data representative of positions where individual strings of black pixels continuous in the main scanning direction begin and end (step S2). The contour of the encoded image data is traced (step S3). Subsequently, character images are separated on the basis of the size of the contour (step S4). Contour data representative of a graphic image left are approximated by vectors in such a manner as to control the errors to less than a threshold (step S5). The loops of the contour vectors are corrected such that they are decomposed into a closed-loop figure having an outer and an inner loop and a unitary figure having only an outer loop (step S6). Pair vectors are chosen from the corrected contour vector loops to thereby determine center lines (step S7). Finally, vectors each being divided into a plurality of segments are united to correct the center line vectors (step S8). While the illustrative embodiment is basically implemented by the center line type method shown in FIGS. 2A to 2C, it is distinguishable from the prior art method in that the loops of contour vectors are decomposed into a simple configuration. With this embodiment, therefore, it is possible to execute rapid and accurate center line processing without resorting to a multi-dimensional data structure.

The sequence of steps outlined above will be described in detail hereinafter.

Input Image Encoding

Figure 4A:
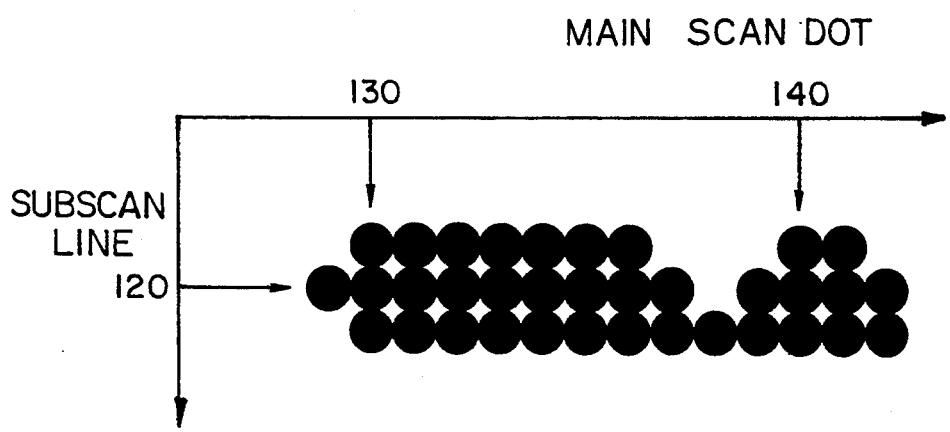
FIGS. 4A and 4B show a specific procedure for encoding an input image particular to the illustrative embodiment.
Figure 4B:
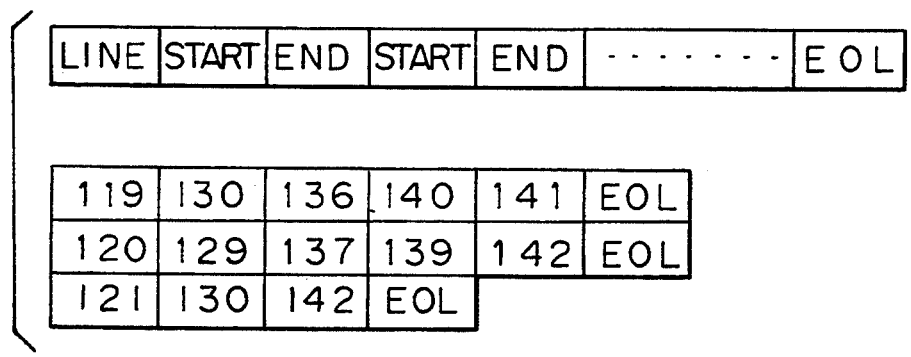

Assume that the digital scanner has produced an image shown in FIG. 4A. In order to reduced the required capacity of a memory for storing the image and to trace the contour at high speed, the image is compressed into data representative of the positions where individual strings of black pixels continuous in the main scanning direction begin and end (such a string of black pixels will hereinafter be referred to as "black run"). The compressed position data are shown in FIG. 4B. For example, on the 119th line as counted in the subscanning direction, a black run begins at the 130th dot in the main scanning direction and ends at the 136th dot. In FIG. 4B, EOL is indicative of an end-of-line code.

Contour Tracing

This processing is such that black pixels each neighboring white pixel of an image are sequentially traced so as to separate a contour loop which terminates at the point where the tracing began. Specifically, in this embodiment, opposite ends (i.e. beginnings and ends) of the individual black runs are traced. In the illustrative embodiment, an outer loop and an inner loop of an image are traced in the counter-clockwise direction and the clockwise direction, respectively. This will be described in detail with reference to a specific case shown in FIG. 5, in which dots and circles are respectively representative of the beginnings and the ends of individual black runs.

Processing (1)

Encoded image data are sequentially examined in order of subscanning lines so as to find out the beginning of a black run which has not been traced.

Processing (2)

A subscanning line next to the beginning (in the positive direction) is checked to see if the beginning of the next black run exists. A prerequisite is that the beginning of the current black run exists between the beginning and the end of the black run on the next line, or that the beginning of the black run on the next line exists between the beginning and the end of the current black run.

Processing (3)

When no black runs are found on the next line by the processing (2), the tracing advances to the end of the current black run and therefrom to the immediately preceding line (in the negative direction) to search for the end of a black run thereon. A prerequisite here is that the end of the current black run exists between the beginning and the end of a black run on the immediately preceding line, as represented by a portion A in FIG. 5.

Processing (4)

Figure 5:
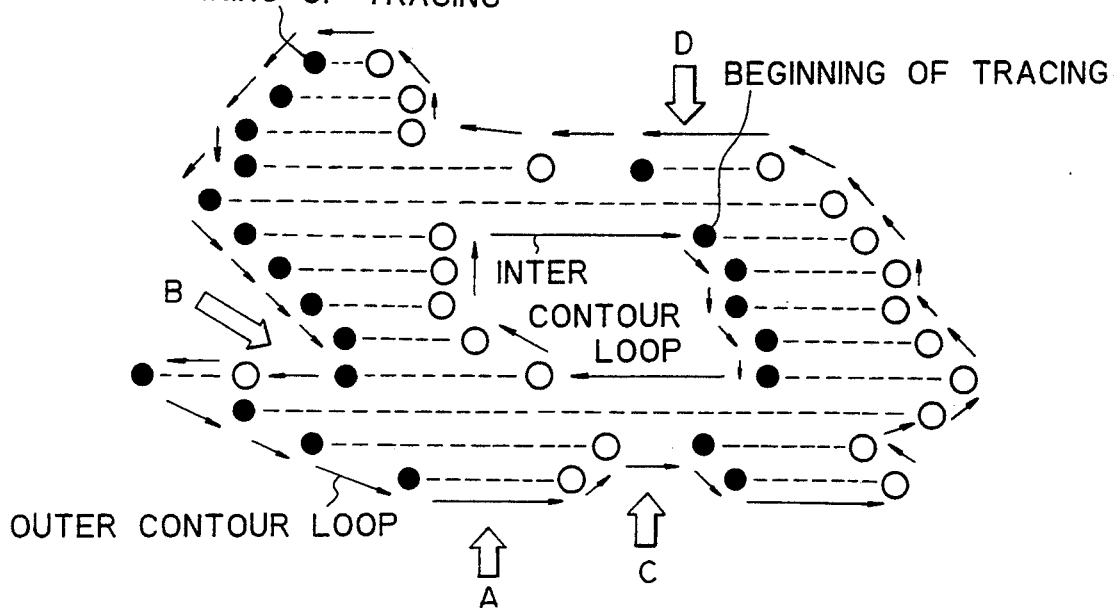
FIG. 5 shows specific processing for tracing a contours of the illustrative embodiment.

In the case that the end of a black run existing on the same line as and at the left-hand side of the current black run is located closer than the beginning of a black run on the next line as determined by the processing (2), the tracing advances to the end of the black run on the same line and, as in the processing (3), to the immediately preceding line (in the negative direction) to search for the end of a black run thereon (as represented by a portion B in FIG. 5).

Processing (5)

When the beginning of a black run existing on the same line as and at the right-hand side of the current black run is located closer than the end of a black run of the preceding line as determined in the processing (3), the tracing advances to the beginning of the black run on the same line and, in the same manner as in the processing (2), to the next line (in the positive direction) to search for the beginning of a black run thereon (as represented by a portion C in FIG. 5).

Processing (6)

If a black run is not found on the preceding line in the processing (3) and (4), the tracing advances to the beginning of the current black run and thereat begins searching for a black run on the next line (in the positive direction) (as represented by a portion D in FIG. 5).

Processing (7)

The tracing of one contour loop is terminated when the processing (2) to (6) is repeated until the point where the tracing started has been reached again. The procedure (1) to (6) is repeated until all the black runs have been traced.

Character Separation

When a rectangle containing the outer contour loop produced by the tracing operation stated above has a horizontal and a vertical dimension both of which are smaller than threshold values assigned to characters, it is determined to be the contour of a character image. Then, a character flag associated with each of black run data is set, and the contour loop data are deleted. After such processing has been executed on all the outer contour loops, the character flags associated with the respective beginnings of black runs of the inner contour loops are examined; if they have been set, the loops are determined to be the inner contour loops of a character image, and the contour loop data are deleted. Further, each black run data is provided with a noise flag. If both the vertical and horizontal dimensions of the rectangle which contain the outer contour loop are smaller than a threshold value associated with noise, the noise flags are set and the contour loop data are deleted. If the noise flags at the respective beginnings of the black runs on the inner contour loop have been set, the contour loop data are deleted. Finally, black run data the character flags of which have not been set are deleted. By such a procedure, only character images are left in the encoded input data while only graphic images are left in the contour loop data.

Approximating Contour by Vectors

Figure 6:
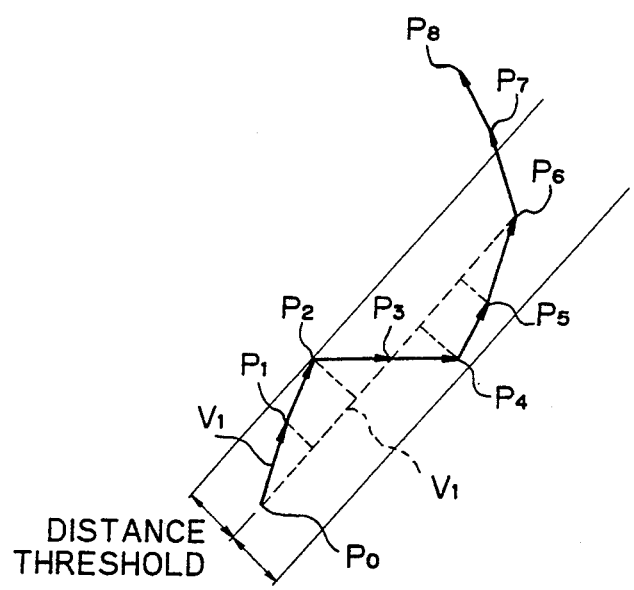
FIG. 6 indicates specific processing for approximating a line image by vectors executed by the illustrative embodiment.

Since many of the contour vectors produced by the above-stated tracing procedure are short, pair vectors which are indispensable in determining center lines cannot be searched for without posing a substantial load on the entire system, By the approximation which will be described, the contour vectors are integrated in such a manner as to maintain an approximation error smaller than a threshold. This is successful in reducing the total amount of data. While approximation may be implemented by either one of a method using angles and a method using distances, the illustrative embodiment adopts the method using distances Specifically, as shown in FIG. 6, the point $P_o$ of a vector where the approximation begins and the end point $P_n$ of a vector which occurs n vectors later than the first vector are connected by a straight line. Then, the distances between the end points $P_2$ to $P_{n-1}$ of the individual vectors intervening between the points $P_o$ and $P_n$ and the straight line are measured. When the distance between any one of the end points of the vector and the straight line is greater than a certain threshold, that end point is determined to be a bending point while the end of the vector $V_1$ is corrected to $P_{n-1}$. This kind of processing is executed with the individual contour loops.

Contour Loop Correction

Figure 7A:
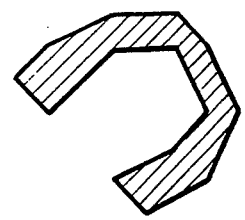
FIGS. 7A to 7D show the general classification of line images together with a specific decomposed composite image attainable with the illustrative embodiment.
Figure 7B:
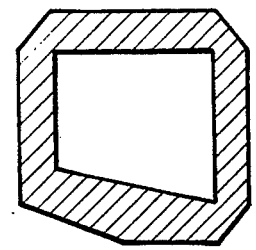
Figure 7C:
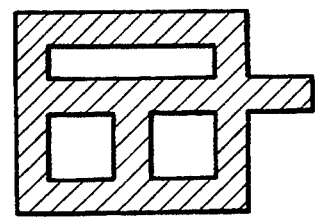
Figure 7D:
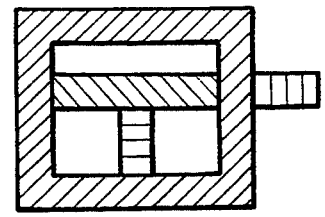

A graphic line image may generally be classified into three different kinds, as shown in FIGS. 7A to 7C. FIG. 7A shows a figure having only a single outer contour loop (hereinafter referred to as a unitary figure), FIG. 7B shows a figure having an outer and an inner contour loop (hereinafter referred to as a closed-loop figure), and FIG. 7C shows a figure composed of unitary figures and a closed-loop figure (hereinafter referred to as a composite figure). The search for vector pairs which are necessary for the transformation of vectors into center lines is readily practicable with the unitary figure of FIG. 7A which has vector pairs in a single contour loop and the closed-loop figure of FIG. 7B which has vector pairs in the outer and inner contour loops. However, when it comes to the composite figure of FIG., 7C, the search processing is complicated and time-consuming. In the light of this, the illustrative embodiment uses decomposing and correcting means which decomposes the composite figure of FIG. 7C, for example, into an assemblage of unitary figures and a closed-loop figure (as indicated by different kinds of hatching). This allows even the vector pairs of a composite figure to be readily searched for.

Figure 8A:
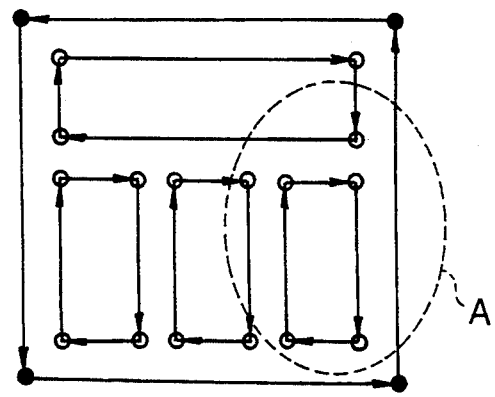
FIGS. 8A to 8C demonstrate a specific procedure for transforming a closed-loop figure into vectors executed by the illustrative embodiment.
Figure 8B:
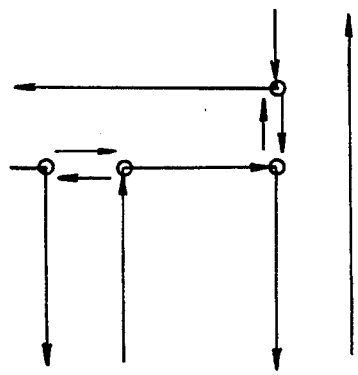
Figure 8C:
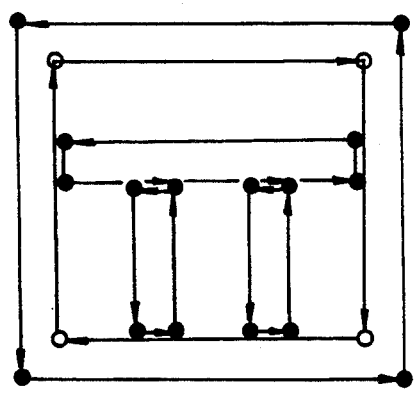

Referring to FIGS. 8A to 8C, a specific procedure for implementing the above-stated decomposition and correction will be described.

Processing (1)

When the absolute value of a difference in angle between successive contour vectors is greater than a threshold, the point where the contour vectors adjoin each other is extracted as a characteristic point. Position data and connection data of such points are registered. Further, positive differences and negative differences are determined to represent branch points and end points, respectively. FIG. 8A indicates such procedure for extracting characteristic points and in which circles and dots are representative of branch points and end points, respectively.

Processing (2)

Among the extracted branch points, two branch points the distance of which is smaller than an allowable line width and shortest are detected. Then, vectors interconnecting the two particular points in opposite directions are newly registered to thereby correct their associated connection data. FIG. 8B shows a portion A of FIG. 8A in an enlarged scale and demonstrates the connection processing associated with the adjoining branch points.

Processing (3)

Contour loops are reconstructed on the basis of the connection data produced by the processing (2), i.e., the loops are classified into outer contour loops of unitary figures and an outer and an inner contour loop of a closed-loop figure. Further, the relationship between the outer and inner contour loops of the closed-loop figure is examined. FIG. 8C indicates the result of the so corrected contour loops.

Conversion into Center Lines

In the illustrative embodiment, since the contours of a figure are simplified by the loop correcting procedure described above, the transformation of contours into center lines can be done if consideration is given only to the two patterns such as shown in FIGS. 7A and 7B.

a. Simple Figure (see FIGS. 9A to 9C)

Processing (1)

Figure 9A:
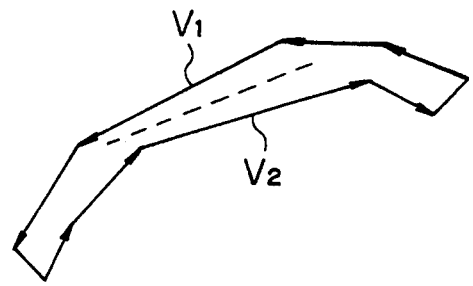
FIGS. 9A to 9C shows a specific procedure for transforming a unitary figure into a center line also executed by the illustrative embodiment.

Among vectors forming the single contour of a unitary figure, a vector longer than a threshold is searched for. In FIG. 9A, a vector $V_1$ is such a vector.

Processing (2)

A vector opposite in direction and closest to the vector $V_1$ is searched for. In FIG. 9A, a vector $V_2$ is such a vector. These vectors $V_1$ and $V_2$ are determined to be the starting pair vectors.

Processing (3)

Figure 9B:
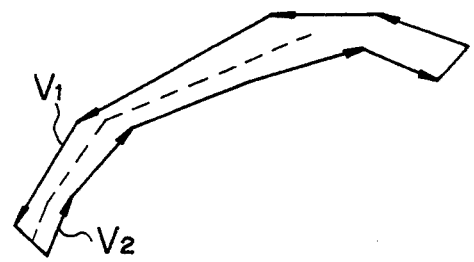

The vectors $V_1$ and $V_2$ are respectively traced in the forward and reverse directions to determined their center line. This is repeated until the center line has been determined up to one end of the contour. Such processing is indicated in FIG. 9B, in which the dashed line is representative of the center line.

Processing (4)

Figure 9C:
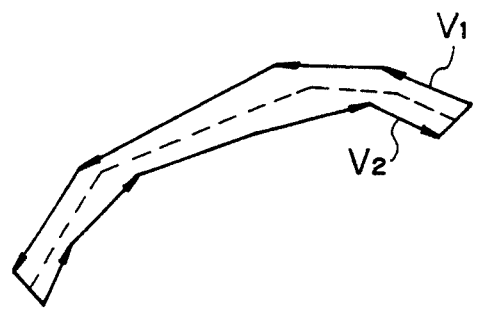

Subsequently, the starting pair vectors $V_1$ and $V_2$ are respectively traced in the reverse and forward directions to determined their center line. This is repeated until the center line has been determined up to the other end of the contour. Such processing is indicated in FIG. 9C, in which the dashed line is representative of the center line.

Figure 10A:
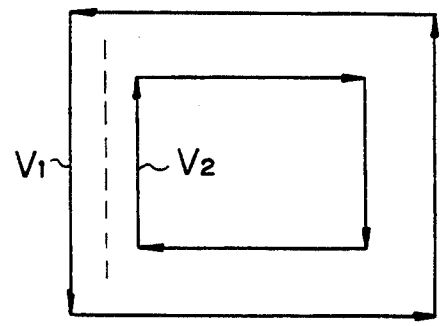
FIGS. 10A to 10C shows a specific procedure for transforming a closed-loop figure into a center line particular to the illustrative embodiment.
Figure 10B:
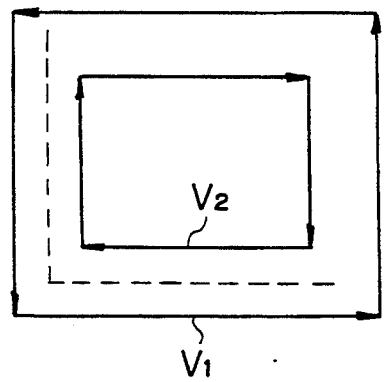
Figure 10C:
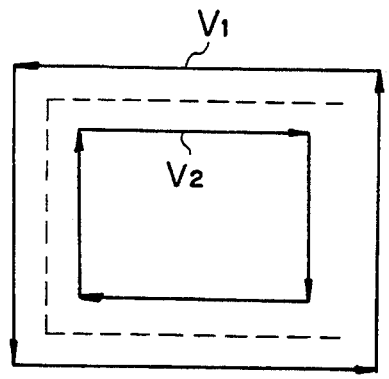

Closed-Loop Figure (see FIGS. 10A to 10C)

Processing (1)

Among the vectors forming the outer contour loop of a closed-loop figure, a vector longer than a threshold is determined, e.g. a vector $V_1$ shown in FIG. 10A.

Processing (2)

Among the vectors forming the inner contour loop of the closed-loop figure, a vector opposite in direction and closest to the vector $V_1$ is searched for, e.g. a vector $V_2$ in FIG. 10A. These two vectors $V_1$ and $V_2$ are determined to be starting pair vectors.

Processing (3)

The starting pair vectors $V_1$ and $V_2$ are respectively traced in the forward and reverse directions to determine their center line. This is repeated until the starting pair vectors $V_1$ and $V_2$ have been reached again. Such processing is indicated in FIGS. 10B and 10C, in which the dashed lines indicate the center line.

Center Line Vector Correction

It may occur that some vector forming a part of the center line produced by the above procedure has been divided into a plurality of segments due to the previously stated decomposition for correction. The correction of center line vectors is adapted to integrate such a plurally of segments of a vector into a single vector. This processing is essentially the same as the processing previously described in [Approximating Contour by Vectors]. Specifically, candidates of two segments of a divided vector are searched for, and then a vector interconnecting adjacent ends of such two segments is presumed. Subsequently, the resulted three vectors are extracted to execute approximation therewith.

Referring to FIGS. 11A to 15B, there are shown the results of experiments conducted with the illustrative embodiment. A system which practices this embodiment is mounted on a work station which is implemented by a 32-bit CPU, for example. For the programming language, use is made of of compiler language whose scale is about 300 lines in total. For the experiments, a digital scanner was used to read text documents of format A5 and each being printed with a different kind of rules, and relatively simple hand-written documents. The digital scanner had a resolution of 400 dots per inch and produced a binary picture composed of 2300×3300 pixels. Characters each had a size of less than 10 millimeters, the vector approximation error was less than one pixel, and the allowable line width was less than 2 millimeters. As FIGS. 11A to 15B indicate, the illustrative embodiment is successful in recognizing and separating characters with accuracy and in transforming an input image exactly into vectors.

The amounts of data particular to the experiments used the documents of FIGS. 11A to 15B are listed below in Table 1.

TABLE 1

Figure 11A:
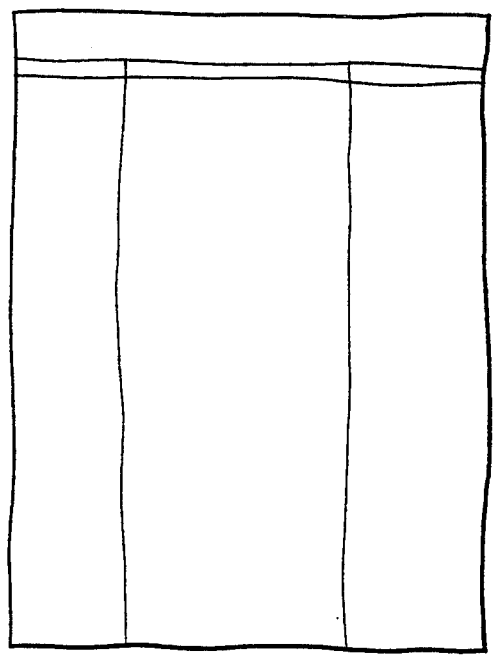
FIGS. 11A to 15B show examples of input images and respective processed images associated therewith.
Figure 11B:
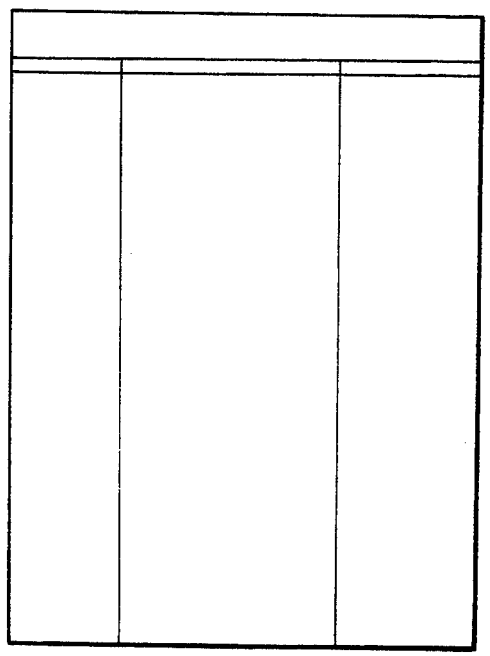
Figure 12A:
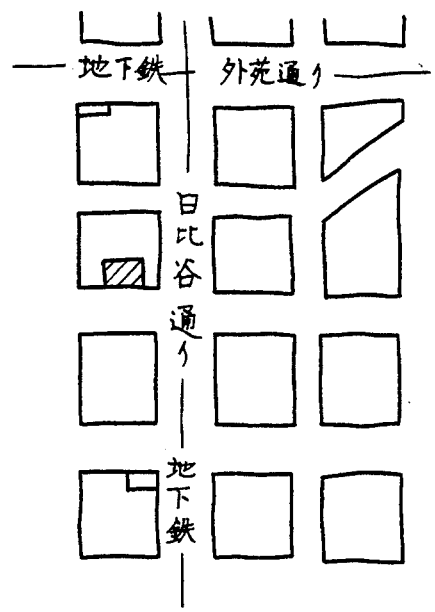
Figure 12B:
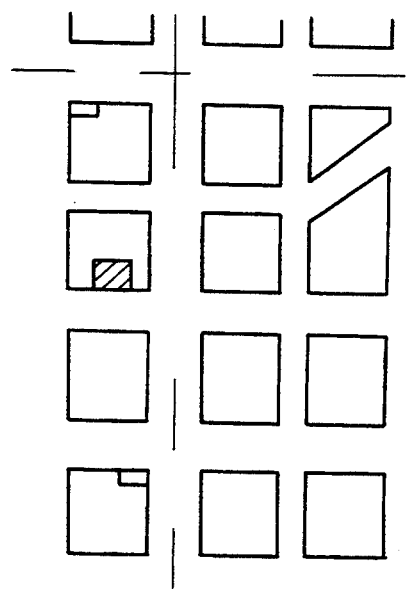
Figure 13A:
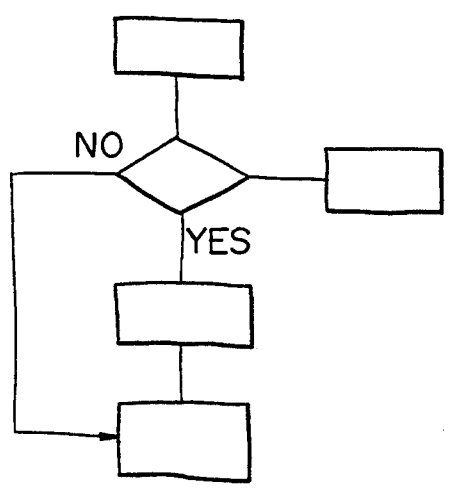
Figure 13B:
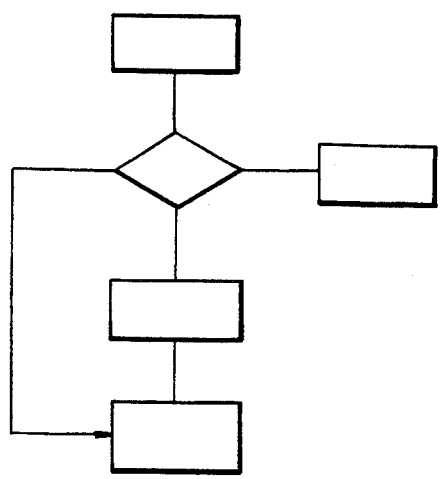
Figure 14A:
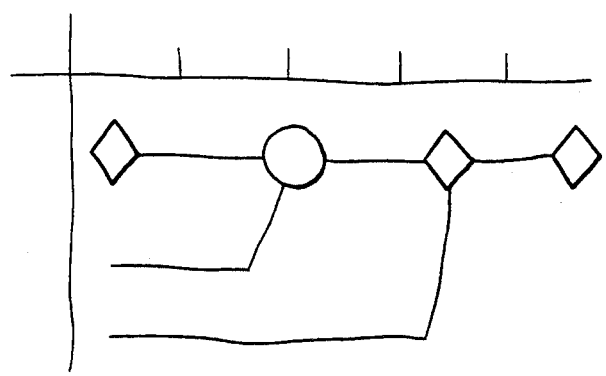
Figure 14B:
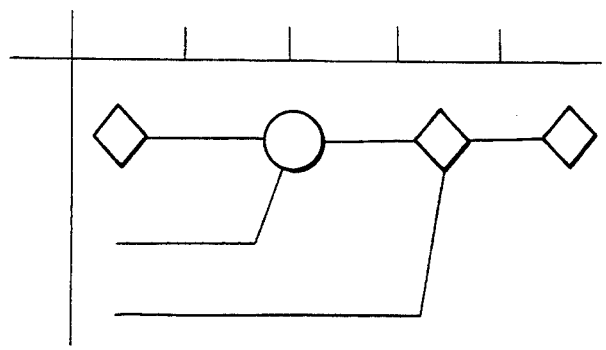
Figure 15A:
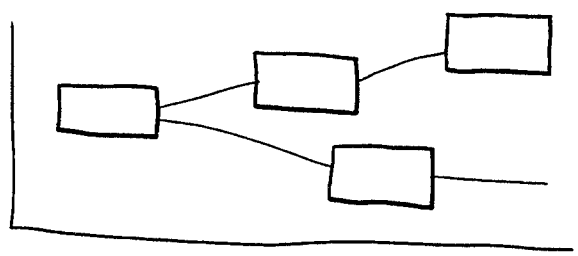
Figure 15B:
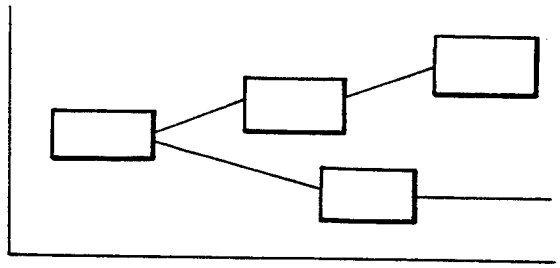

| DOCUMENT | FIGS. 11A & 11B | FIGS. 12A & 12B | FIGS. 13A–15B |
|---|---|---|---|
| ENCODED IMAGE DATA [K BYTE] | 65 | 62 | 51 |
| NUMBER OF CONTOUR DATA | 7231 | 7350 | 6964 |
| NUMBER OF CONTOUR VECTORS (AFTER CORRECTION) | 781 | 1107 | 1093 |
| NUMBER OF CENTER LINES | 543 | 713 | 683 |

From Table 1, it will be seen that an input image of about 900 kilobytes is compressed to about 60 kilobytes by encoding and is further reduced to about 5 kilobytes by the transformation into vectors.

Processing times consumed to process the above documents are listed below in Table 2.

TABLE 2

| DOCUMENT | FIGS. 11A & 11B | FIGS. 12A & 12B | FIGS. 13A–15B |
|---|---|---|---|
| CONTOUR TRACE + CHARACTER SEPARATE [SEC.] | 4.1 | 5.4 | 3.0 |
| CONTOUR VECTOR APPROXIMATE [SEC.] | 4.8 | 4.1 | 3.8 |
| CONTOUR LOOP CORRECT [SEC.] | 0.4 | 3.3 | 2.6 |
| CENTER LINE TRANSFORM + CENTER LINE VECTOR CORRECT [SEC.] | 1.9 | 2.5 | 2.6 |
| TOTAL | 11.2 | 15.3 | 12.0 |

As shown in Table 2, the longest processing time is not more than about 15 seconds, i.e., the illustrative embodiment completes the processing within a very short period of time.

In this connection, Table 3 shown below indicates for comparison purpose the results of experiments associated with the illustrative embodiment and a prior art method which uses a multi-dimensional data structure in transforming vectors into a center line, with respect to the amount of data and the processing time.

TABLE 3

| DOCUMENT | PRIOR ART | FIGS. 12A & 12B |
|---|---|---|
| NUMBER OF VECTORS BEFORE TRANSFORM INTO CENTER LINE | 1250 | 1107 |
| AMOUNT OF VECTOR DATA BEFORE TRANSFORM INTO CENTER LINE [K BYTE] | approx. 67.5 | approx. 8.0 |
| PREPROCESSING + PROCESSING FOR TRANSFORM | 9.3 | 5.8 |

TABLE 3-continued

| DOCUMENT | PRIOR ART | FIGS. 12A & 12B |
|---|---|---|
| INTO CENTER LINES [SEC.] | | 5 |

In Table 3, the words "preprocessing" refers to the contour loop correction processing of the illustrative embodiment or to the multi-dimensional data structure generation processing of the prior art. Concerning the amount of data, the amount of contour vector data before the transformation particular to the prior art is 1,250 vectors and about 67.5 kilobytes, while the illustrative embodiment reduced it to 1,107 vectors and about 8 kilobytes even with the document of FIG. 12A which had the greatest number of vectors. Hence, the illustrative embodiment reduces the required storage capacity to about one-eighth, compared to the prior art. While admitting that illustrative embodiment and the prior art may not be definitely compared with respect to processing time because they differ in the performance of a host computer and input data, the prior art needs about 9 seconds for 1,250 contour vectors while the illustrative embodiment needs only about 6 seconds for 1,107 contour vectors. Hence, it may be said that the illustrative embodiment achieves as high a processing speed as the prior art which uses a multi-dimensional data structure. Further, it is noteworthy that the preprocessing and processing time of the illustrative embodiment is not more than 20 percent to 40 percent of the overall processing time, i.e., the processing for the transformation into a center line imposes a minimum of load on the entire system.

As stated above, the results of experiments conducted with the illustrative embodiment prove that the processing can be executed by software, at high speed, and by using a relatively small memory capacity.

In summary, in accordance with the present invention, decomposing and correcting means decomposes a loop configuration of contour vectors into a simple configuration made up of unitary figures and a closed-loop figure beforehand, and then the center lines of the contour vectors are determined. Hence, even in a portion where lines intersect each other such as in a composite figure, the lines can be transformed into vectors while being prevented from being segmented as far as possible. The decomposition and correction by the above-stated means is implemented as the extraction of characteristic points, the connection of adjoining characteristic points, and the correction of a contour loop. It follows that the loop configuration of contour vectors can be decomposed and corrected rapidly by a minimum of memory capacity and without effecting the processing speed of the entire system.

Various modifications will become possible for those skilled in the art after receiving the teachings of the present disclosure without departing from the scope thereof.

What is claimed is:

1. An apparatus for transforming a two-level image into contour vectors and forming a center line, the apparatus comprising:
   a) dividing and correcting means including:
      1) means for extracting a plurality of characteristic points at which an absolute value of a difference in angle between contour vectors is greater than a first threshold;
      2) means for determining vectors which connect two of the plurality of characteristic points which are spaced apart a distance which is smaller than a predetermined line width; and
      3) means for reconstructing the contour vectors based on the determined vectors, the reconstructing step constituting a step of decomposing a composite figure having (1) at least one unitary figure defined by a single contour loop and (2) at least one closed loop figure defined by two contour loops, into unitary and closed loop figures which are distinguishable from each other; and
   b) center line determining means including:
      1) means for extracting, from among the contour vectors reconstructed by the dividing and correcting means, (1) a first contour vector and (2) a second contour vector closest to and opposite in direction from the first contour vector; and
      2) means for sequentially determining, based on the first and second extracted contour vectors, the center line.

2. The apparatus of claim 1, wherein the center line determining means includes:
   means for determining the center line up to a first end of the figure.

3. The apparatus of claim 1, wherein the center line determining means includes:
   means for forming a portion of the center line as a line segment which is generally parallel to and substantially equidistant between the first and second extracted contour vectors.

4. The apparatus of claim 1, wherein the dividing and correcting means includes:
   means for (1) detecting two branch points, the distance between which is smaller than an allowable line width, and for (2) connecting detected adjacent branch points, so as to form corrected contour loops that define the separably distinguishable unitary figure and close loop figure.

5. An apparatus for transforming a line image of a two-level digital image into contour vectors by tracing a contour of said image in one direction, said apparatus comprising:
   contour tracing means for sequentially tracing black pixels of the line image, each adjoining white pixels, so as to produce contour vectors;
   first extracting means for extracting a point between said contour vectors as a characteristic point, when a difference in angle between the contour vectors has an absolute value greater than a threshold;
   first classifying means for classifying the points extracted by said first extracting means into (a) points at which the differences in angle are positive and (b) points at which the differences in angle are negative;
   connecting vector generating means for generating, in both a positive direction and a negative direction, a connecting vector, the connecting vector connecting, among the points where the differences in angle are positive, two points spaced apart a shortest distance smaller than a predetermined line width;
   second classifying means for reconstructing the contour vectors based on of the generated connecting vectors, and for distinguishing a unitary figure defined by an outer contour loop and a closed loop figure defined by an outer and an inner contour loop;

second extracting means for extracting, from among the contour vectors defining the unitary figure or the closed loop figure, (a) a vector longer than a threshold and (b) a vector closest to and opposite in direction from said vector; and center line determining means for determining, based on the two extracted contour vectors, a center line and for sequentially determining center lines of additional vectors by using said two extracted contour vectors as a start point.

* * * * *